United States Patent Office 2,770,452
Patented Nov. 13, 1956

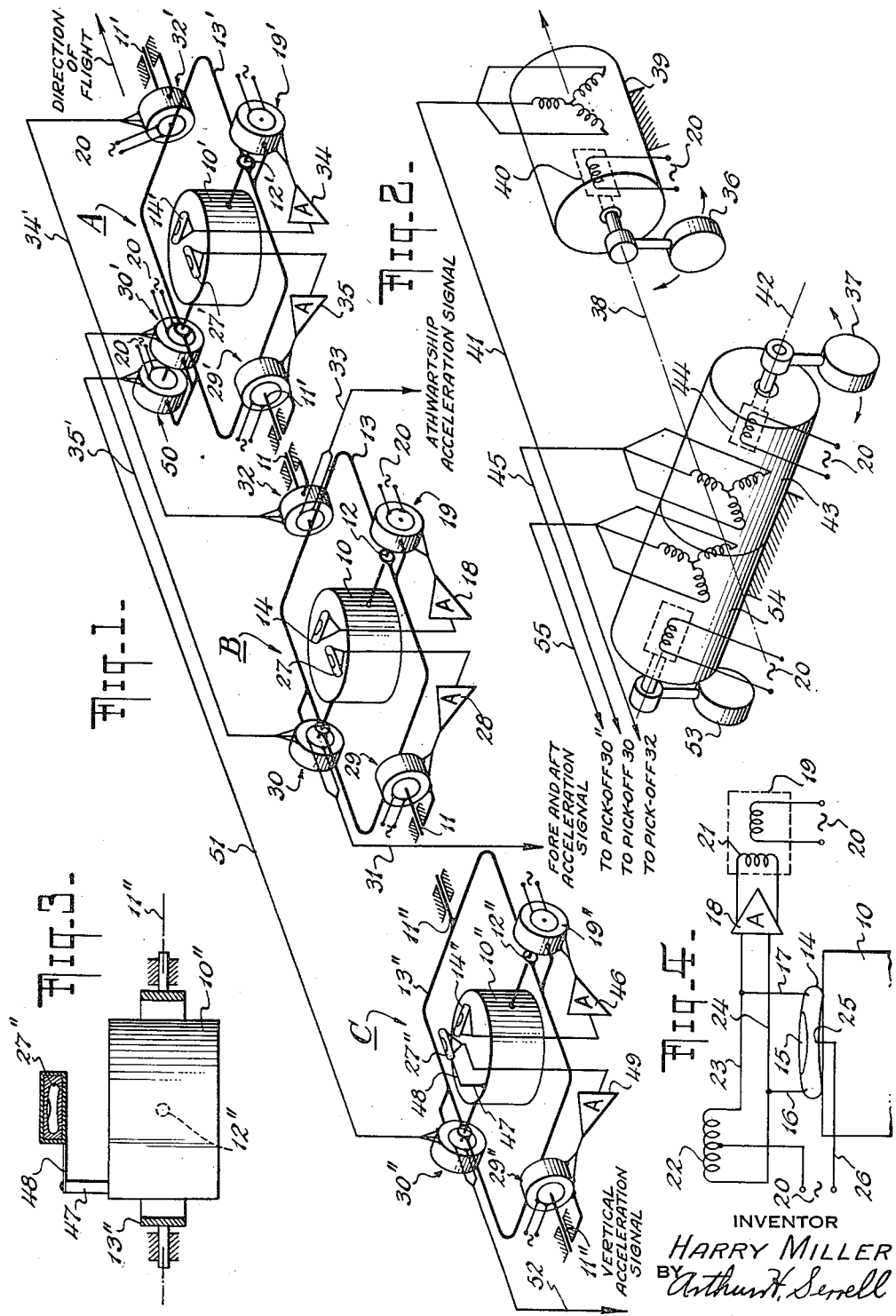

2,770,452

SYSTEM FOR MEASURING THE ACCELERATION OF A DIRIGIBLE CRAFT

Harry Miller, Brooklyn, N. Y., assignor to Sperry Rand Corporation, a corporation of Delaware Application November 26, 1954, Serial No. 471,174

13 Claims. (Cl. 264—1)

This invention relates to a system for measuring components of acceleration along the fore and aft axis of a dirigible craft, along the athwartship axis of the craft, and along the vertical axis of the craft. Furthermore, the improved system particularly derives signals that are proportional to or in accordance with only the horizontal component of acceleration affecting the craft with respect to its fore and aft and athwartship axes and the vertical component of acceleration affecting the craft with respect to its vertical axis.

An object of the invention is to formulate a high performance system that provides accurate acceleration signals with use of readily available equipment such as relatively low performance gyroscopes, gravity sensitive and acceleration responsive devices such as standard liquid levels or pendulums, and signal pick-offs or synchros and torque motors for the gyroscopes.

One of the features of the improved system resides in utilization of a short period vertical reference and a normal period vertical reference in the determination of the fore and aft and athwartship horizontal components of acceleration.

Another feature of the invention is in the provision in the system of two short period vertical reference devices in measuring the vertical component of acceleration relative to the vertical axis of the dirigible craft.

Still a further feature of the improved system lies in utilization thereon of a plurality of vertical reference devices one of which may be alternatively provided by a gyro vertical having a fast acting erecting controller or by a number of short period pendulums responsive to respective accelerations along the fore and aft and athwartship axes of the craft.

Another feature of the invention is provided by the pick-off combination employed in the references included in the system through which the single output or measure of acceleration provided is unaffected by the attitude of the craft during flight.

Other objects, features and structural details of the invention are hereafter set forth in the following description in connection with the accompanying drawing, in which Fig. 1 is a schematic perspective view of a system constructed in accordance with the present inventive concepts.

Fig. 2 is a view similar to Fig. 1 showing a plurality of short period pendulums that may provide the functional equivalent in the system of the short period gyro vertical reference device A illustrated in Fig. 1.

Fig. 3 is an enlarged side elevation view of the reference device of the system having the gravity sensitive element thereon that is responsive to vertical acceleration of the craft, and Fig. 4 is a circuit diagram showing a conventional erecting circuit for the gyroscopic reference devices used in the system.

In the form of the invention depicted in Fig. 1, the improved acceleration detecting system shown includes three vertical reference devices respectively designated at A, B and C. As shown, device B is a conventional gyro vertical whose stable element or rotor case 10 is gimbal mounted on the dirigible craft with freedom about an axis 11 fore and aft of the craft and about a normally horizontal axis 12 athwartship of the craft. This mounting is provided by means of a gimbal ring 13 whose major axis 11 is parallel to the longitudinal or roll axis of the craft. The arrow in Fig. 1 designated direction of flight is parallel to the fore and aft axis of the craft. The axis 12 of the rotor case 10 on the ring 13 is perpendicular to the axis 11 and is situated athwartship of the craft. Axis 12 of the rotor case 10 of the gyro vertical is normally horizontal and parallel to the pitch axis of the craft. The universally supported stable element or case 10 of the reference device B is provided by a closed cylindrical housing containing a gyroscopic element (not shown) that is mounted thereon to spin about a substantially vertical axis.

The erecting controller for the described conventional type of vertical reference B includes a gravity sensing means for detecting tilt of the element 10 about the fore and aft axis 11 in the form of a liquid level device 14. As shown, device 14 is fixed to the element 10 in a position so that the bubble 15 moves in relation to the electrodes 16, 17 as the case tilts from a level or null condition about its axis 11. The other parts of the erecting controller effective to level the case 10 about axis 11 include an amplifier 18 and a torque motor 19. Part 19 of the erector includes a stator that is fixed to the ring 13 and a rotor that is fixed to the element 10. One of the windings of the torque motor 19 is continuously excited from a source of alternating current electrical energy represented at 20. The control winding 21 of the rotor for motor 19 is energized by the output of the amplifier 18. The amplitude and phase of the signal output of the amplifier 18 is dependent on the degree of tilt measured by the level device 14 and the sense of such tilt. As depicted in Fig. 4, the device 14 controls the input to the amplifier 18 through a circuit that may include an autotransformer 22 having a center tap connection to the alternating current source 20. The ends of the transformer 22 are respectively connected to amplifier 18 by way of leads 23, 24. Electrode 16 of the liquid level 14 is connected to lead 24. Electrode 17 of the level 14 is connected to lead 23. A third electrode 25 of the level receives energy from source 20 by way of lead 26. In the circuit arrangement shown, as the level device 14 tilts, the current carried by one of the input leads 23, 24 to the amplifier 18 increases as the other decreases. The amplifier 18 operates accordingly to energize the control field winding 21 of the motor 19 to obtain a torque about the axis 12 that restores the element 10 with the device 14 thereon to its level or null condition.

A gravity sensitive means or liquid level device 27 on the element 10 is also arranged to detect tilt of the element about its minor or athwartship axis 12. This part of the erecting controller for the vertical reference B is effective through amplifier 28 and torque motor 29 to maintain the element 10 in a level condition about axis 12 in the same manner as heretofore described in detail in connection with device 14. The stator or torque motor 29 is fixedly connected to the craft and the rotor thereof is fixed to the gimbal ring 13.

The low gain amplifiers 18 and 28 of the erecting controller described for vertical reference B function to provide a long-term follow-up of a normal period that erects the stable element 10 at a rate of approximately three degrees per minute. An erection control of the noted normal period is sufficiently slow as to not reflect the effect of acceleration on either of the gravitational devices or liquid levels 14 and 27. The stable element 10 is accordingly controlled in accordance with the averaged gravitational vertical sensed by the levels 14 and 27 over a relatively long period. The described gyro vertical B consequently establishes a vertical reference of conventional form for use in the improved system.

With further regard to vertical reference B, Fig. 1, the fore and aft acceleration signal output provided by the system is obtained from the rotor of a two part electrical pick-off or synchro 30 at the athwartship axis of the stable element 10. The stator part of pick-off 30 is connected to the craft through the ring 13 and the rotor part is directly connected to the stable element 10. The pick-off 30 may be a selsyn device whose wound rotor provides the output measurement noted by way of lead 31. The athwartship acceleration signal output provided by the system is obtained from the rotor of a two part electrical pick-off or synchro 32 at the fore and aft axis of the stable element 10. The stator part of the pick-off 32 is directly connected to the craft as clearly shown in Fig. 1. The rotor part of the pick-off 32 is connected to the stable element 10 of the gyro vertical reference B through the gimbal ring 13. The pick-off 32 also may be a selsyn device, as represented, whose wound rotor provides the output measurement noted by way of lead 33.

The vertical reference A shown in Fig. 1 is a gyro vertical whose arrangement in the craft and whose parts are identical to the described reference B except in the respective amplifiers 34 and 35. The elements in reference A that correspond with the parts identified in described reference B are designated by the same number primed. In this connection, the stable element of reference A is indicated at 10', the gimbal ring at 13', the gravity sensitive elements at 14' and 27', respectively, the torque motors at 19' and 29', respectively, and the synchros or pick-offs at 30' and 32', respectively. The amplifiers 34 and 35 in the erection controller for gyro vertical A have a very high gain and provide a follow-up action for the liquid levels that may be sixty times as fast as that provided for the gyro vertical B. This provides an erecting controller of relative short period, compared to the normal period of the controller for reference B, that operates to precess or rotate the stable element 10' from a null condition responsive to accelerations along both the athwartship and fore and aft axes of the craft. In this connection, the gravity sensitive device or liquid level 14' is responsive to acceleration along the athwartship axis of the craft. The sensed acceleration results in a signal from liquid level 14' that operates through high gain amplifier 34 to energize torque motor 19' and effect precession of the stable element 10' from a null condition about its fore and aft axis 11'. The rotor of pick-off 32' that is connected to element 10' through ring 13' is moved accordingly. The rotor of pick-off 30' is moved in a similar manner through operation of torque motor 29' controlled by amplifier 35 when acceleration is sensed by the gravity sensitive device or liquid level 27' along the fore and aft axis of the craft.

To provide a single signal measure of the horizontal component of acceleration along the athwartship axis of the craft, as well as to make the system independent of the attitude of the craft in roll, the fore and aft pick-offs 32' and 32 of the respective vertical references A and B are interconnected in a data transmission system whose output is obtained from lead 33. The input to the means provided for the noted output and including the pick-off 32' and 32 is obtained from an alternating current source 20 connected to the rotor of pick-off 32'. The three phase stator windings of the respective pick-offs 32' and 32 are interconnected by lead 34'. Both of these pick-off stators are connected to the craft so that movement of the craft in roll about its fore and aft axis does not result in any output from the system. The system compares the rotor positions of the respective pick-offs 32' and 32, the first of which moves in accordance with the effect of the horizontal component of acceleration on the level 14' and the other of which is unaffected by the acceleration remains stationary and provides the reference from which the movement of the first rotor is measured. The described athwartship acceleration signal means is operated by both the short period vertical reference A and the normal period vertical reference B.

The athwartship pick-offs 30', 30 are similarly arranged to provide a single signal measure of the horizontal component of acceleration along the fore and aft axis of the craft. In this combination, the input to the data transmission system is provided by connecting the rotor of pick-off 30' to the alternating current source 20. The rotor part of pick-off 30' is connected to the stable element 10' and is moved by precession of the element from its null condition by the action of the torque motor 29' operated by the gravity sensing device or liquid level 27' through the output of high gain amplifier 35. The level 27' of the erecting controller for reference A is responsive to accelerations along the fore and aft axis of the craft. The stators of the respective athwartship pick-offs 30' and 30 are interconnected by lead 35'. Like pick-off 30, the stator of pick-off 30' is connected to the craft through the gimbal ring 13'. Accordingly, movement of the craft in pitch about its athwartship axis does not result in any output from the system. The system compares the rotor positions of the respective pick-offs 30' and 30, the first of which moves in accordance with the effect of the horizontal component of acceleration on the level 27' and the other of which unaffected by the acceleration remains stationary and provides the reference from which the movement of the first rotor is measured. The described fore and aft acceleration signal means is operated by both the short period vertical reference A and the normal period vertical reference B.

In place of the gyro vertical type of vertical reference designated at A in Fig. 1, the system may be constructed to include two short period pendulums respectively indicated at 36 and 37 in Fig. 2. Pendulum 36 is mounted on the craft to move about an axis 38 that is parallel to the longitudinal axis of the craft which corresponds to fore and aft axis 11 or 11' in Fig. 1. The pendulum 36 is responsive to athwartship acceleration of the craft in the manner previously described in connection with liquid level device 14' in Fig. 1. The pick-off controlled by pendulum 36 is indicated at 39. The housing of the pick-off 39 of the system is fixedly connected to the craft and includes a suitable damping fluid for damping the movements of the vertical defining pendulum 36. As shown, the rotor 40 of the selsyn type pick-off 39 is connected to the pendulum 36. The winding of the rotor 40 is energized from a suitable source 20 of alternating current electrical energy. The stator part of the pick-off 39 which moves with the craft about axis 38 is connected to the stator of pick-off 32 of the system by way of lead 41. As far as the system is concerned the outputs of pick-off 32' in Fig. 1 and pick-off 39 in Fig. 2 are identical.

This form of the invention also includes the second short period pendulum 37 which is mounted on the craft to move about axis 42 that is parallel to the pitch axis of the craft. Axis 42 corresponds to the athwartship axis 12 or 12' in Fig. 1. The pendulum 37 is responsive to fore and aft accelerations of the craft in the manner previously described in connection with liquid level device 27' in Fig. 1. The pick-off controlled by pendulum 37 is indicated at 43. The housing of the pick-off 43 of the system is fixedly connected to the craft and includes a suitable damping fluid for damping the movements of the vertical defining pendulum 37. As shown, the rotor 44 of the selsyn type pick-off 43 is connected to the pendulum 37. The winding of the rotor 44 is energized from a suitable source 20 of alternating current electrical energy. The stator part of the pick-off 43 which moves with the craft about axis 42 is connected to the stator of pick-off 30 of the system by way of lead 45. The output of pick-off 43 is equivalent to the output of pick-off 30' as far as the system is concerned.

The vertical reference C shown in Fig. 1 is a third gyro vertical whose arrangement in the craft and whose parts are similar to the described references A and B. In this connection, the elements in reference C that correspond with the parts identified as described references B and C are designated by the same number double primed. As shown, the stable element or rotor case of the reference C is indicated at 10'', the fore and aft axis at 11'', the athwartship axis 12'', the gimbal ring at 13'', the roll tilt sensing liquid level at 14'', the pitch tilt sensing liquid level at 27'', the athwartship pick-off at 30'', the torque motor at the major axis of the stable element 10'' at 29'' and the torque motor at the minor axis of the stable element 10'' at 19''. In this reference, the amplifier 46 connecting the level 14'' and torquer 19'' is of low gain characteristic so this portion of the erecting controller functions similarly to the corresponding low period controller in the gyro vertical B.

The gravity sensitive means or liquid level device 27'' in the vertical reference C is secured to the rotor case 10'' by means of a post 47, Fig. 3 and a flexible member or cantilever spring 48. The level device 27'' together with an added weight providing housing is located at the end of the spring 48 in a position to be responsive to vertical accelerations. Level device 27'' is also located on the element 10'' to detect tilt thereof about the minor axis 12'' of the vertical reference. The amplifier 49 receiving the signal from level device 27'' is a high gain amplifier such as amplifier 35 in the erecting controller for vertical reference A. The erecting controller for the vertical reference C consequently operates with a corresponding short period which is effective to precess the stable element 10'' thereof from a null condition about its athwartship or minor axis 12''. To compensate for any component in the output of the gravity sensing means or liquid level 27'' that may be due to fore and aft accelerations to which the same is also responsive in the same manner as level device 27', the system includes an additional pick-off 50, Fig. 1, at the athwartship axis of the stable element 10'. Like pick-off 30', the pick-off 50 may be a selsyn device whose rotor part is connected to the element 10' and whose stator is connected to the craft through gimbal ring 13'. The rotor of the pick-off 50 is energized from the alternating current source 20. The stator of the pick-off 50 is connected to pick-off 30'' by means of lead 51. The output of the rotor of pick-off 30'' to lead 52 provides the measure of vertical acceleration sensed by the system and as indicated in Fig. 1 carries the vertical acceleration signal. The means for providing the vertical acceleration signal includes the two pick-offs 30'' and 50 and is operated by two short period vertical references. The output in lead 52 does not reflect the attitude of the craft in pitch as the respective stators of the pick-offs 30'' and 50 move together with the craft as the craft climbs or dives. The reference rotor pick-off in this combination is provided by the rotor of pick-off 50 which rotates about axis 12' in accordance with fore and aft acceleration. The compared rotor of pick-off 30'' rotates about axis 12'' in accordance with the same fore and aft acceleration in addition to the vertical component of acceleration affecting the level device 27''. The difference between the respective rotor displacements as measured by the data transmission system including the two pick-offs 50 and 30'' is the measure of vertical acceleration contained in output lead 52.

The signal of pick-off 50 in the system may be duplicated by use of an additional short period vertical reference in the form of pendulum 53 and pick-off 54. Short period pendulum 53 is mounted, as shown in Fig. 2, for movement about athwartship axis 42, the same being responsive to fore and aft acceleration of the craft. The housing of the pick-off 54 is fixedly connected to the craft and includes a suitable damping fluid for damping the movements of the pendulum 53. As shown, the rotor of the pick-off 54 is connected to the pendulum 53. The winding of the rotor of the pick-off 54 is energized from the source of alternating current electrical energy 20. The stator of the pick-off 54 is connected to the pick-off 30'' of the system by way of lead 55. The three short period pendulums 36, 37 and 53 provide the equivalent action in the system of the short period gyro vertical A.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a system for measuring the horizontal component of acceleration along the athwartship axis of a dirigible craft, the combination of, a pair of gyro verticals having respective stable elements mounted on the craft with freedom about axes fore and aft of the craft and about normally horizontal axes athwartship of the craft; an erecting controller of relative short period for one of the gyro verticals precessing the stable element thereof from a null condition about its fore and aft axis including gravity sensing means responsive to acceleration along the athwartship axis of the craft, a second erecting controller of normal period for the other of the gyro verticals maintaining the stable element thereof at a null condition about its fore and aft axis including gravity sensing means for detecting tilt of the stable element about the fore and aft axis, and a pick-off at each of the respective fore and aft axes of the gyro verticals interconnected to provide a single signal measure of the horizontal component of acceleration along the athwartship axis of the craft.

2. In a system for measuring the horizontal component of acceleration along the athwartship axis of a dirigible craft, the combination of, a pair of gyro verticals having respective stable elements mounted on the craft with freedom about axes fore and aft of the craft and about normally horizontal axes athwartship of the craft, an erecting controller of relative short period for one of the gyro verticals precessing the stable element thereof from a null condition about its fore and aft axis including a liquid level device responsive to acceleration along the athwartship axis of the craft, a second erecting controller of normal period for the other of the gyro verticals maintaining the stable element thereof at a null condition about its fore and aft axis including a liquid level device for detecting tilt of the stable element about the fore and aft axis, and means providing an output proportional to the horizontal component of acceleration along the athwartship axis of the craft including a first fore and aft pick-off having a part connected to the craft and a part connected to the stable element of the gyro vertical having the short period erecting controller, and a second fore and aft pick-off having a part connected to the craft and a part connected to the stable element of the gyro vertical having the normal period erecting controller.

3. In a system for measuring the horizontal component of acceleration along the athwartship axis of a dirigible craft, the combination of, a short period vertical reference having a gravity sensitive device responsive to athwartship acceleration of the craft, a normal period vertical reference having a gravity sensitive device for detecting tilt about the fore and aft axis of the craft, and means providing an output proportional to the horizontal component of acceleration along the athwartship axis of the craft including a first pick-off having a part connected to the craft and a part operatively connected to the gravity sensitive device of the short period vertical reference, and a second pick-off having a part connected to the craft and a part operatively connected to the gravity sensitive device of the normal period vertical reference.

4. In a system for measuring the horizontal component of acceleration along the athwartship axis of a dirigible craft, the combination of, a short period pendulum responsive to athwartship acceleration of the craft, a normal period vertical reference having a gravity sensitive device for detecting tilt about the fore and aft axis of the craft, and means providing an output proportional to the horizontal component of acceleration along the athwartship axis of the craft including a first pick-off having a part connected to the craft and a part connected to said pendulum, and a second pick-off having a part connected to the craft and a part operatively connected to the gravity sensitive device of the normal period vertical reference.

5. In a system for measuring the horizontal component of acceleration along the fore and aft axis of a dirigible craft, the combination of, a pair of gyro verticals having respective stable elements mounted on the craft with freedom about axes fore and aft of the craft and about normally horizontal axes athwartship of the craft, an erecting controller of relative short period for one of the gyro verticals precessing the stable element thereof from a null condition about its athwartship axis including gravity sensing means responsive to acceleration along the fore and aft axis of the craft, a second erecting controller of normal period for the other of the gyro verticals maintaining the stable element thereof at a null condition about its athwartship axis including gravity sensing means for detecting tilt of the stable element about the athwartship axis, and a pick-off at each of the respective athwartship axes of the gyro verticals interconnected to provide a single signal measure of the horizontal component of acceleration along the fore and aft axis of the craft.

6. In a system for measuring the horizontal component of acceleration along the fore and aft axis of a dirigible craft, the combination of, a pair of gyro verticals having respective stable elements mounted on the craft with freedom about axes fore and aft of the craft and about normally horizontal axes athwartship of the craft, an erecting controller of relative short period for one of the gyro verticals precessing the stable element thereof from a null condition about its athwartship axis including a liquid level device responsive to acceleration along the fore and aft axis of the craft, a second erecting controller of normal period for the other of the gyro verticals maintaining the stable element thereof at a null condition about its athwartship axis including a liquid level device for detecting tilt of the stable element about the athwartship axis, and means providing an output proportional to the horizontal component of acceleration along the fore and aft axis of the craft including a first athwartship pick-off having a part connected to the craft and a part connected to the stable element of the gyro vertical having the short period erecting controller, and a second athwartship pick-off having a part connected to the craft and a part connected to the stable element of the gyro vertical having the normal period erecting controller.

7. In a system for measuring the horizontal component of acceleration along the fore and aft axis of a dirigible craft, the combination of, a short period vertical reference having a gravity sensitive device responsive to fore and aft acceleration of the craft, a normal period vertical reference having a gravity sensitive device for detecting tilt about the athwartship axis of the craft, and means providing an output proportional to the horizontal component of acceleration along the fore and aft axis of the craft including a first pick-off having a part connected to the craft and a part operatively connected to the gravity sensitive device of the short period vertical reference, and a second pick-off having a part connected to the craft and a part operatively connected to the gravity sensitive device of the normal period vertical reference.

8. In a system for measuring the horizontal component of acceleration along the fore and aft axis of a dirigible craft, the combination of, a short period pendulum responsive to fore and aft acceleration of the craft, a normal period vertical reference having a gravity sensitive device for detecting tilt about the athwartship axis of the craft, and means providing an output proportional to the horizontal component of acceleration along the fore and aft axis of the craft including a first pick-off having a part connected to the craft and a part connected to said pendulum, and a second pick-off having a part connected to the craft and a part operatively connected to the gravity sensitive device of the normal period vertical reference.

9. In a system for measuring the vertical component of acceleration along the vertical axis of a dirigible craft, the combination of, a pair of gyro verticals having respective stable elements mounted on the craft with freedom about axes fore and aft of the craft and about normally horizontal axes athwartship of the craft, an erecting controller of relative short period for one of the gyro verticals precessing the stable element thereof from a null condition about its athwartship axis including gravity sensing means responsive to acceleration along the fore and aft axis of the craft, a second erecting controller of relative short period for the other of the gyro verticals precessing the stable element thereof from a null condition about its athwartship axis including gravity sensing means responsive to acceleration along the vertical axis of the craft, and a pick-off at each of the respective athwartship axes of the gyro verticals interconnected to provide a single signal measure of the vertical component of acceleration along the vertical axis of the craft.

10. In a system for measuring the vertical component of acceleration along the vertical axis of a dirigible craft, the combination of a pair of gyro verticals having respective stable elements mounted on the craft with freedom about axes fore and aft of the craft and about normally horizontal axes athwartship of the craft, an erecting controller of relative short period for one of the gyro verticals precessing the stable element thereof from a null condition about its athwartship axis including a liquid level device responsive to acceleration along the fore and aft axis of the craft, a second erecting controller of relatively short period for the other of the gyro verticals precessing the stable element thereof from a null condition about its athwartship axis including a liquid level device responsive to acceleration along the vertical axis of the craft, and means providing an output proportional to the vertical component to acceleration along the vertical axis of the craft including two athwartship pick-offs having parts connected to the craft and parts connected to the stable elements of the respective gyro verticals.

11. In a system for measuring the vertical component of acceleration along the vertical axis of a dirigible craft, the combination of a first short period vertical reference having a gravity sensitive device responsive to acceleration along the fore and aft axis of the craft, a second short period vertical reference having a gravity sensitive device responsive to acceleration along the vertical axis of the craft, and means providing an output proportional to the vertical component of acceleration including a first pick-off having a part connected to the craft and a part operatively connected to said fore and aft acceleration responsive gravity device, and a second pick-off having a part connected to the craft and a part operatively connected to said vertical acceleration responsive gravity device.

12. In a system for measuring the vertical component of acceleration along the vertical axis of a dirigible craft, the combination of, a short period pendulum responsive to fore and aft acceleration of the craft, a short period vertical reference having a gravity sensitive device responsive to acceleration along the vertical axis of the craft, and means providing an output proportional to the vertical component of acceleration including a first pick-off having a part connected to the craft and a part connected to the pendulum, and a second pick-off having a part connected to the craft and a part operatively connected to said vertical acceleration responsive gravity device.

13. A system for measuring horizontal and vertical accelerations along the responsive fore and aft, athwartship and vertical axes of a dirigible craft comprising a short period vertical reference having gravity sensitive devices responsive to athwartship and fore and aft accelerations of the craft, respectively, a normal period vertical reference having gravity sensitive devices for detecting tilt about the fore and aft axis and athwartship axis of the craft, a second short period vertical reference having a gravity sensitive device responsive to vertical acceleration of the craft, means for providing a signal proportional to the fore and aft acceleration of the craft operated by said first short period vertical reference and said normal period vertical reference, means for providing a signal proportional to the athwartship acceleration of the craft operated by said first short period vertical reference and said normal period vertical reference, and means for providing a signal proportional to the vertical acceleration of the craft operated by said first short period vertical reference and said second short period vertical reference.

References Cited in the file of this patent

UNITED STATES PATENTS

| | | |
|---|---|---|
| 2,367,465 | Kunzer | Jan. 16, 1945 |
| 2,446,180 | Haskins | Aug. 3, 1948 |
| 2,487,793 | Esval | Nov. 15, 1949 |